United States Patent [19]

Nakamura

[11] 3,842,287
[45] Oct. 15, 1974

[54] HYBRID ELECTRIC CAR

[75] Inventor: Kazumasa Nakamura, Toyota, Japan

[73] Assignee: Toyota Jidosha Kogyo Kabushiki Kaisha, Toyota-shi, Japan

[22] Filed: June 11, 1973

[21] Appl. No.: 368,483

[30] Foreign Application Priority Data
June 12, 1972 Japan................................. 47-57679

[52] U.S. Cl....................... 290/16, 290/14, 290/17, 318/139, 180/65
[51] Int. Cl............................................ B60l 11/02
[58] Field of Search............ 290/14, 17; 180/60, 16, 180/65; 318/139

[56] References Cited
UNITED STATES PATENTS

| | | | |
|---|---|---|---|
| 3,263,142 | 7/1966 | Adoutte et al. | 290/14 |
| 3,551,685 | 12/1970 | Corry | 290/14 |
| 3,585,473 | 6/1971 | Huxtable | 290/14 |
| 3,659,168 | 4/1972 | Salihi | 290/14 |
| 3,699,351 | 10/1972 | Addie | 290/17 |
| 3,735,220 | 5/1973 | Renner | 290/14 |
| 3,771,821 | 11/1973 | Rist et al. | 290/14 |

*Primary Examiner*—G. R. Simmons
*Attorney, Agent, or Firm*—Toren, McGeady and Stanger

[57] ABSTRACT

In the hybrid electric car disclosed, a generator driven by a heat engine turns a motor which moves the vehicle. A main circuit controls the motor with power from the generator. The main circuit includes a first thyristor and relay contact for connecting the main circuit and the battery in series with each other or in parallel with each other and a commutation circuit that operates as a chopper. A second thyristor passes the energy from the generator to the motor in the form of pulses. A switch-over circuit opens the relay contact on the basis of the relationship between the degree to which the accelerator pedal is depressed and the motor speed so as to connect the main battery and the generator in series. An output ratio control circuit turns the two thyristors on so that the generator and main battery outputs are supplied to the motor together. The output of the battery is varied by the first thyristor in response to the degree to which the accelerator pedal is depressed.

12 Claims, 5 Drawing Figures

HYBRID ELECTRIC CAR

REFERENCE TO COPENDING RELATED APPLICATION

This application is related to the copending application of Kazumasa Nakamura, entitled "Hybrid Electric Power Vehicle," relying upon a Japanese priority application 47 728/1972 filed May 16, 1972, and being filed in the United States on or about the date of this application.

The content of that application is hereby made a part of this application as if fully recited herein.

BACKGROUND OF THE INVENTION

This invention relates to an electric car and particularly to electric cars powered by both battery and heat-engine-driven generators.

In such cars an electric generator which charges a battery is driven by a heat engine. Together the battery and generator form a power source which turns the motor that moves the car.

In general, the counter-emf of direct current series motors commonly used for hybrid types of electrically powered vehicles has been determined by the motor speed and field current. As the motor speed increases, such motors become less and less capable of efficiently utilizing all the electric power available from the power source at voltages lower than a predetermined level. For this reason, the voltage of the power source is set high enough to permit high motor speeds.

Such operation of the motor is not desirable because the choppers which control the motor supply voltage at low speeds become comparatively inefficient. To eliminate this disadvantage, means have been considered for permitting changes in the connection between the generator and the main battery from parallel to series or vice versa. Thus, the generator and battery may be connected in parallel for slow motor speeds and in series for high motor speeds. However, connections based on the speed of the motor alone are not sufficient for controlling the speed of the vehicle. It fails to take into account the intent of the operator.

An object of the invention is to improve such hybrid electric power sources for motor vehicles.

Another object of the invention is to improve vehicles of this type.

Still another object of the invention is to avoid the aforementioned difficulties.

Yet another object of the invention is to control the battery and generator connection on the basis of the input by the operator and obtain optimum speed control.

SUMMARY OF THE INVENTION

According to a feature of the invention, these objects are attained, in whole or in part, by changing the connections of the battery and generator so that they energize the motor, either in parallel or in series with each other, on the basis not only of the motor speed, but the extent to which an operator depresses the accelerator pedal.

These features improve the driving performance of the vehicle and allow it to operate at high efficiency with minimum battery discharge.

These and other features of the invention are pointed out in the claims. Other objects and advantages of the invention will become evident from the following detailed description when read in light of the accompanying drawings.

DESCRIPTION OF PREFERRED EMBODIMENTS

Figure 1:
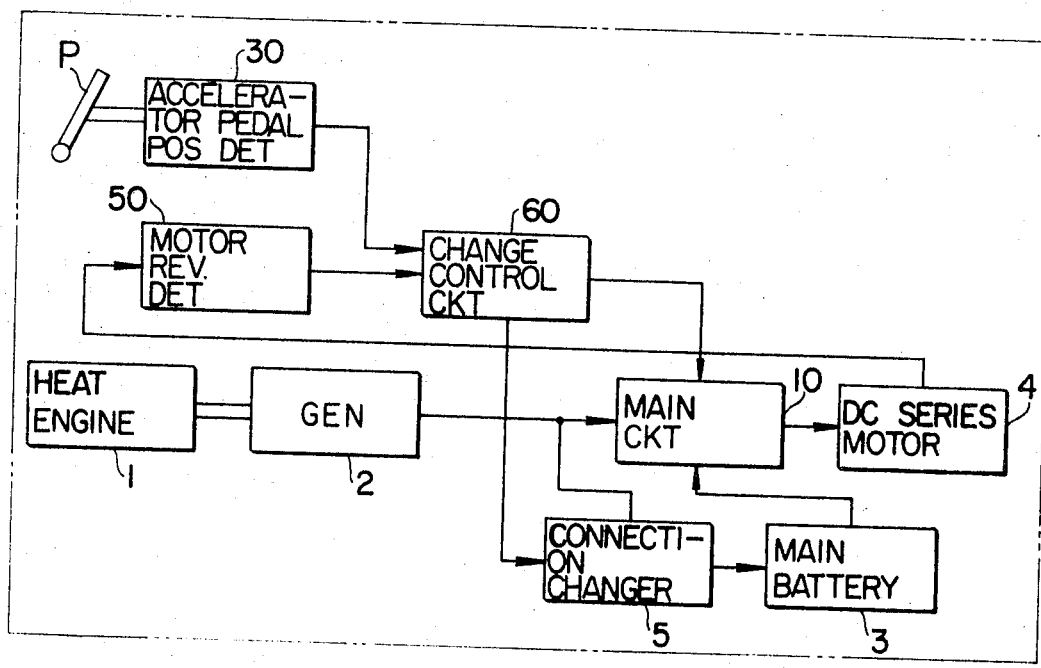
FIG. 1 is a block diagram illustrating a hybrid electric power vehicle embodying features of the invention.

In FIG. 1, a hybrid electric power vehicle V embodying this invention includes a heat engine 1 which drives a generator 2. According to one embodiment of the invention, the generator 2 is a DC generator. According to another embodiment of the invention, the generator 2 is an AC generator having a rectifier system. A main battery 3 receives a charge from the generator 2 through a connection changer 5 and a DC series motor 4 moves the vehicle.

A main circuit 10 controls the power supplied to the motor 4 from the generator 2 and the main battery 3. An accelerator-pedal position sensor detects the position of an accelerator pedal P to determine the amount that the pedal is depressed.

A motor speed detector 50 detects the number of revolutions of the motor per unit time. A change control circuit 60 determines the operating condition of the vehicle based upon the relationship between the depression of the accelerator pedal and the motor speed. The control circuit 60 operates the connection changer 5 in the main circuit 10.

Figure 2:
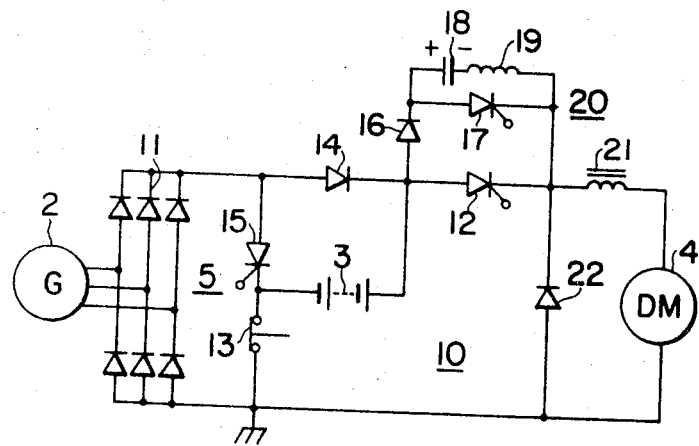
FIG. 2 is a circuit diagram illustrating details of a power system in the vehicle of FIG. 1.

FIG. 2 illustrates the circuit opposed of the generator 2, the main battery 3, the motor 4, the connection changer 5, and the main circuit 6. In FIG. 2, the generator 2 is embodied as a three-phase generator G with a three-phase rectifier 11 using diodes 11A. The connection changer 5 uses a normally closed relay contact 13 and a diode 14 to connect the battery 3 in parallel with the generator 2 while a thyristor 15 is off. When the relay contact 13 is opened, and the thyristor 15 ignited, the connection changer 5 connects the battery 3 in series with the generator 2.

The output of the generator 2 energizes the motor 4 through its rectifier 11 composed of diodes 11A. As stated, the normally closed relay contact 13 and a diode 14 connects the main battery in parallel with the rectifier 11, when the thyristor 15 is non-conductive. Thus, the main battery 3 is effectively connected in parallel to the generator 2 by rendering the thyristor 15 non-conductive and closing the contact 13. The main battery 3 is effectively connected in series with the generator by turning on the thyristor 15 and making it conductive in opening the contact 13.

In the main circuit 10, a thyristor 12 controls the motor 4. The thyristor 12 is connected in parallel with a commutation circuit 20 composed of a diode 16, a thyristor 17 for turning off the thyristor 12, a capacitor 18, and a coil 19. A reactor 21 and a flywheel diode 22 smooth the operating current of the motor when the battery and generator are connected in series as well as in parallel. Control means (not shown) control the generator 2 to produce a constant voltage high enough to charge the main battery 3.

The three thyristors 12, 15, and 17 are rendered conductive only after being triggered with trigger signals applied between their respective gates and cathodes.

The commutation circuit 20 serves to turn off the conducting thyristor 12. When the thyristor 17 is triggered to become conductive, it makes the capacitor 18, which has been charged to the polarity shown, discharge so that current flows from the capacitor 18 through the conductive thyristor 17. Owing to the inductance of the coil 19, the capacitor 18 takes the reverse polarity when the above current has decreased to zero. The capacitor 18, which is now charged in the reverse polarity, urges current to flow through the thyristor 12 in the reverse direction so that thyristor 12 is turned off. After turning off the thyristor 12, the capacitor 18 is charged again by the battery 3. This chopper operation produces pulsating power which is supplied to the motor 4.

Figure 3:
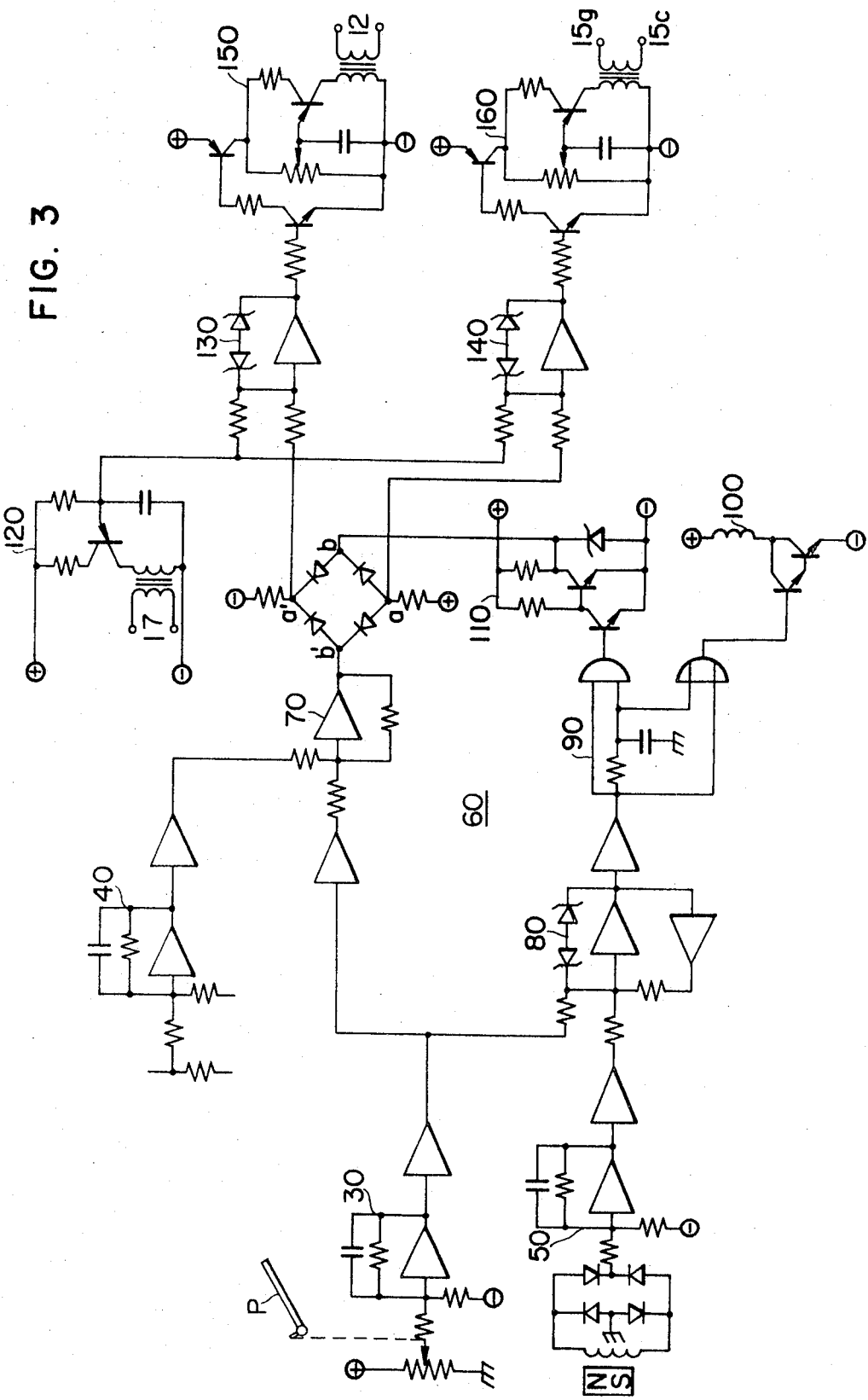
FIG. 3 is a circuit diagram illustrating the control system for the circuit of FIG. 2.
Figure 4:
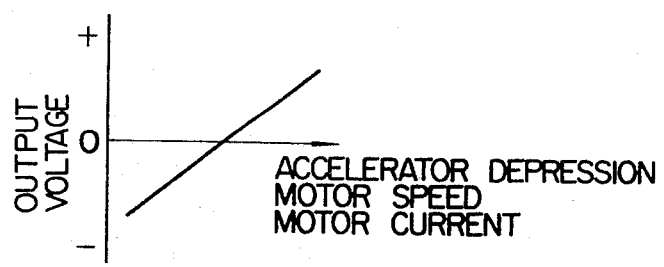
FIG. 4 is a graph illustrating the characteristics curve of detectors used in connection with the circuits and systems disclosed in FIGS. 1 and 3.

The thyristors 12, 15, and 17 are controlled by the control system illustrated in FIG. 3. Here the accelerator pedal position detector 30 changes its resistance in proportion to the degree to which the accelerator pedal P is depressed. Because of the positive potential applied to the variable resistor and the negative potential applied by the voltage divider, a positive or negative voltage proportional to the degree to which the accelerator pedal is depressed is obtained as shown in FIG. 4. The motor speed or revolution detector 50 rectifies an alternating electromotive force induced in response to the rotation of the motor 4 and converts it into a direct current. By calculating the direct current with respect to the voltage of the constant voltage source, the motor revolution detector 50 produces a positive or negative voltage proportional to the speed, or number of revolutions per unit time, of the motor. This is also shown by the curve in FIG. 4.

In the change control circuit 60, an operating condition discriminator circuit 80, a sequence circuit 90, and a relay contact actuator circuit 100 operate the normally closed relay contact 13. A trigger change circuit 110 combines with a modulator circuit 140 and a trigger generator circuit 160 to ignite the thyristor 15. In addition, a current detector 40, arithmetic circuit 70, reference generator 120, pulse width modulator circuit 130, and trigger generator circuit 150 operate the thyristors 12 and 17.

The operating condition discriminator circuit 80 receives an input from the accelerator pedal position detector 30. The magnitude of the signal corresponds to the extent of which the accelerator pedal is depressed. Another input signal to the circuit 80 corresponds to the speed or revolutions of the motor detected by the motor revolution detector 50. The operating condition discriminator circuit 80 compares the sum of the above-mentioned two signals with the change-over point represented by the dotted line or solid line shown in FIG. 5. The circuit 80 produces a positive output signal only when the sum is located to the right of the changing points requiring series connection at high speed.

The change sequence circuit receives the output of the discriminator circuit 80 and produces outputs from its two terminals. However, the timing of the outputs from the circuit 90 vary as the input signal is changed from positive to negative or from negative to positive.

The relay contact actuator circuit 100 responds to one of the output terminals of the circuit 90 and causes the relay contact 13 to open in response to an input signal causing excitation of a coil in the circuit 100.

Figure 5:
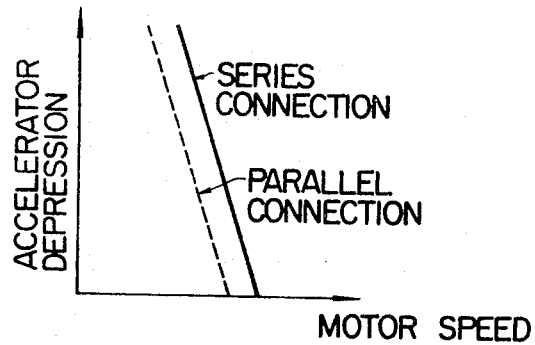
FIG. 5 is a diagram illustrating the switch-over patterns for the circuits in FIGS. 1 to 3.

The detectors 30 and 50, and circuits 80, 90, and 100 cause the relay contact 13 to remain in its normally closed state when they determine that the extent to which the accelerator pedal is depressed and the speed of the motor define a point which is located on the left of the locus of changing points along the lines shown in FIG. 5. The relay contact then connects the main battery 3 in parallel with the generator 2. At this time, of course, it is assumed that the thyristor 15 is non-conductive.

On the other hand, when the vehicle is operating at high speed and the detectors and circuits determine that the point is located to the right of the lines, the relay contact 13 is opened. Thus, the main battery is no longer connected in parallel with the generator. Here again, it is assumed that the thyristor 15 is non-conductive. The trigger change circuit 110 responds to the other output terminal of the change sequence circuit 90 and causes an input terminal b of a bridge circuit to be positive when the trigger change circuit receives a signal. It causes the terminal b to be negative when no signal is received. The other input terminal $b'$ of the bridge is connected to the arithmetic circuit 70 which produces a signal responsive to the difference between the extent to which the accelerator pedal is depressed, as detected by the accelerator pedal position detector 30 and the motor current detected by the current detector 40. When the potential at the input terminal b is positive, the potential of the input terminal $b'$ appears at the output terminal a. When the potential at the terminal b is negative, a negative potential appears at the output terminal $a$.

The pulse width modulator 140 receives the signal appearing at the output terminal a of the circuit 110 and a sawtooth waveform produced by the reference oscillator 120. The circuit 140 thus produces an output depending upon the positive or negative condition of the sum of two inputs. When the potential of the input terminal $b'$ is being received, the pulse width modulator 140 changes its output signal from positive to negative to produce a rectangular waveform whose pulse width varies in dependence upon the value of the input signal. When a negative potential is received, the pulse width modulator 140 keeps its output signal positive.

When the output signal of the circuit 140 is positive, a unijunction transistor 161 within the trigger generator circuit 160 is rendered non-conductive. This produces a trigger signal at the terminals 15g and 15c of a pulse transformer when the signal is changed from positive to negative. The terminals 15g and 15c are connected to the gate and cathode of the thyristor 15 so that a trigger signal across these terminals turns on the thyristor 15.

With this arrangement of the circuits 110, 140, and 160, a signal produced by the change sequence circuit 90 turns on the thyristor to its conductive state, thereby connecting the main battery 3 in series with the generator 2. On the other hand, if the change sequence circuit 90 produces no output, the thyristor 15 is non-conductive thereby interrupting the series connection between the generator 2 and the main battery 3.

Another pulse width modulator 30 connects the other output terminal a' of the circuit 110 to a trigger generator circuit 150. The trigger generator circuit 150 operates the thyristor 12 and operates the thyristor 17 by means of the reference oscillator 120 in order to control the power of the pulse waveform supplied to the motor 4 in dependence upon the difference between the amount the accelerator pedal is depressed and the motor current. Also, interruption of the thyristor 15 is effected by commutation of the thyristor 12.

Using this construction, the operating condition of the vehicle is determined by the relation between the extent to which the accelerator pedal is depressed and the speed of the motor. When the vehicle is operating at low speed, the signal will be produced neither by the relay contact actuator circuit 100 nor the trigger generator circuit 160. Hence the normally closed relay contact 13 connects the main battery in parallel with the generator 2. In this way a definite constant voltage is applied to the motor 4. The time during which power is supplied changes depending upon the operating condition of the vehicle.

When the vehicle operates at high speed requiring the series connection, both circuits 100 and 160 produce their signals. Hence the normally closed relay contact is opened. This renders thyristor 15 conductive. Thus, the main battery 3 is connected in series with the generator 2. The output of the generator is added to the output of the battery and supplied to the motor 4. Distribution of the battery output will then vary depending upon the change of ratio of conductive periods between the thyristor 12 and the thyristor 15. Thus, the power supplied to the motor is controlled.

At this time, when a change between series and parallel connection occurs, the delay action between the outputs developed by the change sequence circuit 90 causes the relay contact 13 to open the parallel connection first, when the connection is being changed from parallel to series. On the other hand, the change sequence circuit 90 causes the thyristor 15 to break the series connection first, when the connection between the generator 2 and the battery 3 is being changed from series to parallel.

As illustrated in the foregoing, the hybrid electric car according to this invention makes it possible automatically to change the connection between the generator 2 and the main battery 3 to a series or a parallel connection. Hence, the invention permits operation with a parallel connection as well as a series connection as determined by the switch-over pattern shown in FIG. 5. Therefore, the power from the generator 2 and the main battery 3 is applied more effectively to the motor 4. Also, because the switch-over characteristic that determines the change between the series connection and the parallel connection is determined by the two signals, i.e., the signals indicating the extent to which the accelerator pedal is depressed and the vehicle speed or the motor speed, it is possible to match the speed control of the vehicle to its operation.

According to an embodiment of the invention, a thyristor motor, transistor motor, or combination of an AC motor with a frequency converter, replace the DC series motor, thereby replacing the thyristors with transistors.

While embodiments of the invention have been described in detail, it will be obvious to those skilled in the art that the invention may be embodied otherwise.

What is claimed is:

1. A hybrid-type electric power drive apparatus for a vehicle having an accelerator pedal, comprising a heat engine, a generator driven by said heat engine, a main battery, coupling means between said battery and said generator and changeable between one condition connecting said battery and said generator in parallel so that said generator charges said battery and a second condition connecting said generator and said battery in series, main circuit means for controlling the power from said battery and said generator, a DC motor for driving the vehicle with power from said main circuit means, detecting means for detecting the degree to which the accelerator pedal is depressed and for detecting the current supplied to the motor as well as the speed of the motor, and ratio control circuit means responsive to said detecting means and said main circuit means and coupled to said coupling means for controlling the connection between said battery and said generator by changing the coupling means between one condition and the other in response to the degree of depression of the accelerator pedal and the motor speed.

2. An apparatus as in claim 1, wherein said coupling means includes series connecting means for connecting said battery and said generator in series and parallel connecting means for connecting said battery and said generator in parallel, said control circuit means enabling said parallel connection means and disabling said series connection means when the relation between the extent to which the accelerator is depressed and the speed of the motor exhibit a first relationship, said control circuit means disabling said parallel connection means and enabling said series connection means when the relation between the extent to which the accelerator pedal is depressed and the speed of the motor exhibits a second relationship.

3. An apparatus as in claim 1, wherein said coupling means includes first and second switch means connected across said generator and forming a junction between them, said battery being connected to said junction, and unidirectional means connecting said generator and said battery, said ratio control means alternately opening and closing one of said switch means.

4. An apparatus as in claim 1, wherein said ratio control means further controls the operation of said main circuit means.

5. An apparatus as in claim 4, wherein said main circuit means includes a thyristor connected in series between said generator and said motor, and extinguishing means for extinguishing said thyristor.

6. An apparatus as in claim 5, wherein said extinguishing means includes a capacitor and a diode connecting said capacitor across said thyristor so as to charge the capacitor with current in the same direction as the main current flow through said thyristor, and means for reversing the charge on said capacitor for producing a charge which extinguishes said thyristor.

7. An apparatus as in claim 6, wherein said means for reversing includes an inductor connected in series with said capacitor and a switch connected across said inductor and capacitor.

8. An apparatus as in claim 3, wherein said ratio control means further controls the operation of said main circuit means.

9. An apparatus as in claim 3, wherein said main circuit means includes a thyristor connected in series between said generator and said motor, and extinguishing means for extinguishing said thyristor.

10. An apparatus as in claim 9, wherein said extinguishing means includes a capacitor and a diode connecting said capacitor across said thyristor so as to charge the capacitor with current in the same direction as the main current flow through said thyristor, and means for reversing the charge on said capacitor for producing a charge which extinguishes said thyristor.

11. An apparatus as in calim 10, wherein said means for reversing includes an inductor connected in series with said capacitor and a switch connected across said inductor and capacitor.

12. An apparatus as in claim 11, wherein said ratio control means further controls the operation of said main circuit means.

* * * * *

UNITED STATES PATENT OFFICE
CERTIFICATE OF CORRECTION

Patent No. 3,842,287            Dated  October 15, 1974

Inventor(s)  KAZUMASA NAKAMURA

It is certified that error appears in the above-identified patent and that said Letters Patent are hereby corrected as shown below:

In the heading of the patent, change:

"[75]  Inventor: Kazumasa Nakamura, Toyota Japan

[73]  Assignee: Toyota Jidosha Kogyo Kabushiki Kaisha,
        Toyota-shi, Japan"

to:

--[75]  Inventor: Kazumasa Nakamura, Toyota-shi, Aichi-ken, Japan

[73]  Assignee: Toyota Jidosha Kogyo Kabushiki Kaisha,
        Toyota-shi, Aichi-ken, Japan--

Signed and sealed this 8th day of April 1975.

(SEAL)
Attest:

RUTH C. MASON
Attesting Officer

C. MARSHALL DANN
Commissioner of Patents
and Trademarks